June 5, 1945.                M. L. DAVIES                2,377,405
                         FASTENING DEVICE
                        Filed July 1, 1943

WITNESS:
Robt P Mitchel

INVENTOR
Michael L. Davies
BY
Busser Harding
ATTORNEYS

Patented June 5, 1945

2,377,405

UNITED STATES PATENT OFFICE 2,377,405

FASTENING DEVICE

Michael L. Davies, Philadelphia, Pa.

Application July 1, 1943, Serial No. 493,031

9 Claims. (Cl. 151—14)

This invention relates to a fastening device, such, for example, as a bolt and nut.

Generally speaking, the fastening device according to this invention comprises a member adapted to engage the work and a second member adapted to engage the work and adapted to cooperate with the first member through the medium of a novel arrangement of spiral surfaces adapted, when the device is under holding tension, to lock the members together.

The device according to this invention, among other advantages, will be found to automatically lock, to be proof against loosening from stretch or from vibration, to be readily unlocked and to be reuseable to a largely greater extent than are devices of the general type as heretofore known.

Having now indicated in a general way the nature and purpose of this invention, I will proceed to a detailed description thereof as embodied, for illustrative purposes, in a bolt and nut, with reference to the accompanying drawing in which.

In the several figures A and B represent two members to be secured together, C represents a bolt extending through the members A and B and having a head D adapted to bear against member A; and E represents a nut engaged with the bolt and adapted to bear against the member B.

The bolt C is provided with a pair of threads $f$ and $g$ starting at the free end of the bolt at points 180° apart. The nut E is likewise provided with two threads $f'$ and $g'$, corresponding, respectively, to the threads $f$ and $g$. The nut is desirably tapped on a slight taper opening from the shoulder of the nut to the face adapted to bear on the work. By way of example, the nut may be tapped with a taper of about .007 of an inch.

The threads $f$ and $g$ on the bolt will be different. Thus, the thread $f$ will have its faces at the same angle, while the thread $g$ will have one of its faces at the same angle as the faces of the thread $f$ and its opposite face at a lesser angle.

Figure 1:
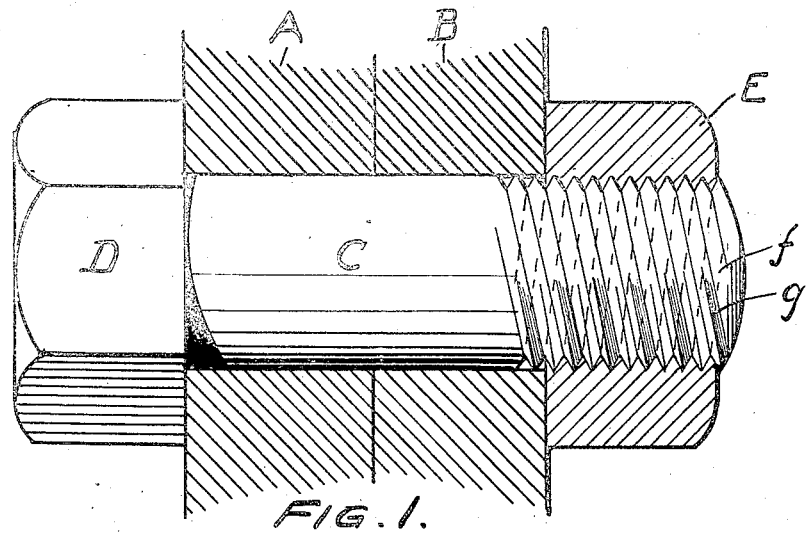
Figure 1 is a view of a bolt and nut in fastening relation with a pair of elements, the nut and elements being shown in section.
Figure 2:
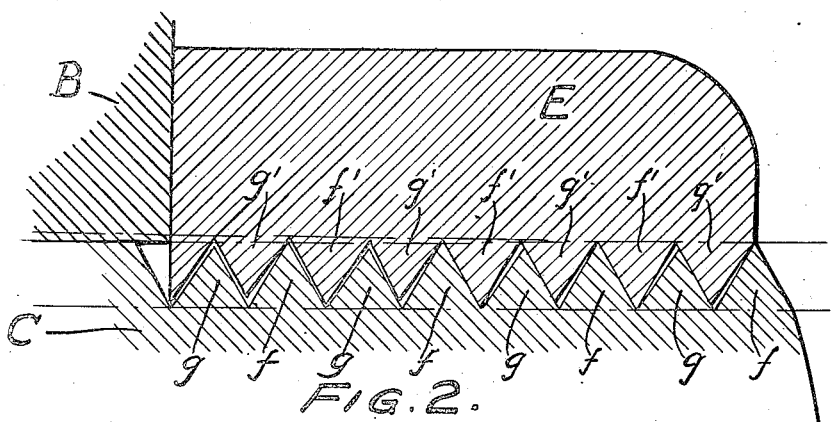
Figure 2 is an enlarged sectional view of a portion of the showing of Figure 1 to show detail of construction of the cooperating threads on the bolt and on the nut.
Figure 3:
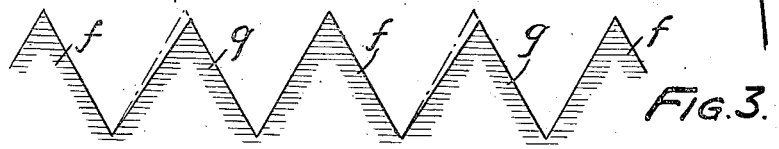
Figure 3 is a diagrammatic view of a portion of the threading on the bolt.

By way of example, as shown in Figures 2 and 3, the thread $f$ may be a standard thread having its faces extending at an angle of 60° and in such case the thread $g$ will have one of its faces extending at an angle of 60° and its opposite face extending at an angle of 55°.

The threads $f'$ and $g'$ in the nut E, respectively, will correspond exactly with the threads $f$ and $g$ on the bolt.

Figure 4:
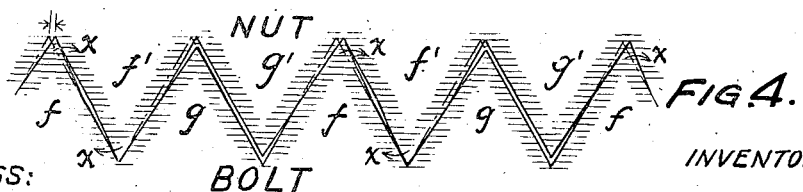
Figure 4 is a diagrammatic view showing the threads of the nut and bolt in locking position, greatly exaggerated.

When the nut E is threaded on the bolt, the slight taper will facilitate engagement of the threads $f$, $g$ and $f'$, $g'$ and when the nut is set up against the work and the bolt put under tension, causing the nut to be in effect forced back, the threads $f'$ and $g'$ will be pulled back toward the threads $g$, $f$, causing the apices or edge portions of the threads $f$, $f'$ to be turned or sprung back, as at $x$, Figure 4, to lock the nut to the bolt.

The slight taper in the nut E will give a looseness on the bolt, particularly adjacent the work, which will cause a tendency to cross threading as the nut is set up, which will enhance the locking effect.

The nut may be readily removed from the bolt, since the locking effect of the pairs of threads is readily overcome by the leverage afforded by a wrench and is relieved as soon as the nut is backed off sufficiently to relieve tension on the bolt.

The nut may be removed and replaced from the bolt many times before the combination becomes ineffective, since in the locking of the pairs of threads the metal of the edge portions of the threads $f$ and $g$ is sprung rather than permanently displaced. Thus the combination does not become worn with repeated applications and removals of the nut, but rather fails only when the metal becomes fatigued.

It will be understood that it is not intended that the claims appended hereto shall be limited to details described above for the purpose of a full understanding of this invention since it will be appreciated that various modifications may be made without departing from the scope of this invention.

What I claim and desire to protect by Letters Patent is:

1. A fastening device comprising a pair of cooperating members, one of which has a work engaging head and the other of which is adapted to engage the work, and a pair of threads on each of the members, the pairs of threads each comprising a thread both faces of which extend at the same angle and a thread one of the faces of which extends at a less angle than that of the extension of the faces of the first mentioned threads of the pairs.

2. A fastening device comprising a pair of cooperating members, one of which has a work engaging head and the other of which is adapted to engage the work, and a pair of threads on each of the members, the pairs of threads each comprising a thread both faces of which extend at the same angle and a thread one of the faces of which extends at a less angle than that of the extension of the faces of the first mentioned threads of the pairs and the other face of which extends at about the same angle as that of the extension of the faces of the first mentioned threads.

3. A fastening device comprising a pair of cooperating members, one of which has a work engaging head and the other of which is adapted to engage the work and one of the members being tapered with respect to the other, and a pair of threads on each of the members, the pairs of threads each comprising a thread both faces of which extend at the same angle and a thread one of the faces of which extends at a less angle than that of the extension of the faces of the first mentioned threads of the pairs.

4. A fastening device comprising a pair of cooperating members, one of which has a work engaging head and the other of which is adapted to engage the work, and a pair of threads on each of the members, the pairs of threads each comprising a standard thread and a thread one of the faces of which extends at a less angle than that of the extension of the faces of the first mentioned threads of the pairs.

5. A fastening device comprising a pair of cooperating members, one of which has a work engaging head and the other of which is adapted to engage the work, and a pair of threads on each of the members, the pairs of threads each comprising a thread the faces of which extend at an angle of about 60° and a thread one face of which extends at an angle of about 55°.

6. A fastening device comprising a pair of cooperating members, one of which has a work engaging head and the other of which is adapted to engage the work and one of the members being tapered with respect to the other, and a pair of threads on each of the members, the pairs of threads each comprising a thread the faces of which extend at an angle of about 60° and a thread one face of which extends at an angle of about 55°.

7. A fastening device comprising a pair of cooperating members, one of which has a work engaging head and the other of which is adapted to engage the work, and a pair of threads on each of the members, the pairs of threads each comprising a thread the faces of which extend at an an angle of about 60° and a thread one face of which extends at an angle of about 55° and the other face of which extends at an angle of about 60°.

8. A fastening device comprising a member having a pair of external threads and a member having a pair of internal threads adapted to engage with said externally threaded member, the pairs of threads with which said members respectively are provided each comprising a thread both faces of which extend at the same angle and a thread one of the faces of which extends at a less angle than that of the extension of the pairs of the first mentioned threads of the pairs.

9. A fastening device comprising a member having a pair of external threads and a member having a pair of internal threads adapted to engage with said externally threaded member, the pairs of threads with which said members respectively are provided each comprising a thread both faces of which extend at the same angle and a thread one of the faces of which extends at a less angle than that of the extension of the faces of the first mentioned threads of the pairs and the other face of which extends at about the same angle as that of the extension of the faces of the first mentioned threads.

MICHAEL L. DAVIES.